3,296,005
BRONZE-SMOKE OPHTHALMIC GLASS COMPOSITION

James E. Duncan, Natrona Heights, and Joseph E. Cooper, Brackenridge, Pa., assignors to Pittsburgh Plate Glass Company, Pittsburgh, Pa., a corporation of Pennsylvania
No Drawing. Filed Dec. 23, 1964, Ser. No. 420,793
6 Claims. (Cl. 106—52)

The present invention relates to a family of pleasing bronze-smoke colored prescription type ophthalmic crown glasses for use in lenses having eye corrective and eye protective properties.

The standard glass used in the ophthalmic trade is a clear white spectacle crown glass having an index of refraction of 1.523±.001, a coefficient of thermal expansion of between $4.9 \times 10^{-6}$ and $5.3 \times 10^{-6}$ per degree Fahrenheit from 70° F. to 575° F., and a softening point of approximately 1328 to 1338° F. The softening point is defined by the American Society for Testing Materials as the temperature at which the viscosity of the glass is $10^{7.6}$ poises.

The softening point, index of refraction, and thermal expansion properties are especially important when the clear crown glass is employed to make a multifocal lens. Multifocal lenses are made by fusing a segment of glass having a relatively high index of refraction (above about 1.58) to a ground and polished countersunk area of the crown glass. The expansion characteristic of the different glasses must be similar to avoid excessive strains or breakage in the fused multifocal lens.

Rose-smoke or reddish-brown colored crown glasses, particularly those containing a considerable amount of iron, have softening points below about 1300° F. Because of this, these colored crown glasses cannot be made into multifocal lenses in the same ovens at the same temperature conditions and at the same time as clear crown glasses being heated to form multifocal lenses. Thus, it has been necessary to make the clear and the rose-smoke or reddish-brown colored multifocal lenses at different times if the lens manufacturer has only one oven for making the lenses. Considerable down time is incurred to change the oven temperature between runs. The other alternative is to build another oven and this is not economically feasible when the oven cannot be utilized full time.

It is, therefore, a desideratum of the art to be able to fuse colored ophthalmic crown and segment glasses with the same equipment and at the same time and temperature as is used for the fusing of clear white crown and segment glasses. This would permit a continuous and more economical operation without interruptions for temperature changes, when different types of glasses are being fused to form the various types of lenses. This requires that the colored crown glass have approximately the same softening point as the clear white crown glass.

In accordance with the present invention, a family of bronze-smoke colored crown glasses having softening points approximating the softening point of clear white crown glass, i.e., above about 1315° F. and usually 1315 to 1338° F., indices of refraction of 1.521 to 1.525, and a coefficient of thermal expansion between 4.9 and $5.3 \times 10^{-6}$ per ° F. between 70° F. and 575° F. is provided. These glasses can be satisfactorily fused with high-index segment glasses and have required luminous transmittance characteristics as well as low ultra-violet and infrared transmittances.

The family of bronze-smoke glasses of the present invention is described by the following calculated range of compositional ingredients.

| Component: | Percent by weight |
|---|---|
| $SiO_2$ | 65.0–73.0 |
| $Na_2O$ | .0–7.0 |
| $K_2O$ | 9.0–19.0 |
| $ZnO$ | 4.0–10.0 |
| $BaO$ | 0.5–5.0 |
| $Al_2O_3$ | 0.1–4.0 |
| $Fe_2O_3$ | 1.5–5.5 |
| $CoO$ | 0.003–0.012 |
| $Se$ | 0.0001–0.2 |
| $Sb_2O_5$ | 0.0–2.0 |

Glasses which are representative of the invention were prepared from the batch ingredients indicated in the following Table I in accordance with the procedure set forth in Example I. The calculated compositions for these glasses are presented in Table II below. The components in Table I are given in parts by weight. The components expressed in percent by weight are based on the total amounts introduced and, therefore, do not necessarily represent the percentages remaining in the finished glasses. It is recognized that a substantial amount of the selenium introduced may be volatilized during melting depending upon the temperature and atmospheric conditions.

TABLE I

| | Parts by Weight | | | | |
|---|---|---|---|---|---|
| | 1 | 2 | 3 | 4 | 5 |
| Sand | 967 | 968 | 953 | 958 | 950 |
| Soda Ash | 160 | 142 | 160 | 146 | 144 |
| Potassium Carbonate | 214 | 206 | 203 | 200 | 200 |
| Zinc Oxide | 103 | 94 | 124 | 116 | 124 |
| Barium Carbonate | 42 | 26 | 61 | 56 | 96 |
| Sodium Nitrate | 10 | 10 | 10 | 10 | 10 |
| Aluminum Hydrate | | 11 | | 11 | 11 |
| Sodium Antimonate | | 10 | | 10 | 10 |
| Rouge | 70 | 72 | 55 | 53 | 31 |
| Cobalt Oxide | 0.175 | 0.156 | 0.133 | 0.156 | 0.094 |
| Selenium | 0.375 | 1.313 | 0.422 | 1.000 | 0.813 |

TABLE II

| | Percent by Weight | | | | |
|---|---|---|---|---|---|
| | 1 | 2 | 3 | 4 | 5 |
| $SiO_2$ | 68.3 | 69.2 | 67.3 | 67.8 | 66.8 |
| $Na_2O$ | 6.9 | 6.3 | 6.9 | 6.4 | 6.3 |
| $K_2O$ | 10.1 | 9.9 | 9.6 | 9.5 | 9.4 |
| $ZnO$ | 7.3 | 6.7 | 8.8 | 8.2 | 8.7 |
| $BaO$ | 2.3 | 1.5 | 3.4 | 3.1 | 5.3 |
| $Al_2O_3$ | .1 | .6 | .1 | .6 | .6 |
| $Sb_2O_5$ | | .6 | | .6 | .6 |
| $Fe_2O_3$ | 4.9 | 5.1 | 3.9 | 3.7 | 2.2 |
| $CoO$ | 0.0124 | 0.0112 | .0094 | .0111 | .0066 |
| $Se$ | 0.0266 | 0.0940 | .0299 | .0709 | .0573 |

The significant optical and physical properties of the glasses indicated above are presented in Table III below:

TABLE III

| Glass Property | 1 | 2 | 3 | 4 | 5 |
|---|---|---|---|---|---|
| Total light transmittance for a 2 mm. thick glass sample | 21.0 | 21.0 | 32.0 | 32.0 | 50.0 |
| Index of Refraction ($N_D$) | 1.5231 | 1.5230 | 1.5234 | 1.5232 | 1.5231 |
| Softening Point Degrees Fahrenheit | 1,316 | 1,322 | 1,321 | 1,321 | 1,333 |
| Coefficient of Thermal Expansion $\times 10^{-6}$ per ° F. between 70° F. and 575° F. | 4.9 | 4.9 | 4.9 | 4.9 | 4.9 |

The glasses of the present invention should be melted under neutral or slightly oxidizing conditions. The melting atmosphere conditions are important because the colorants of the glass are sensitive to the degree of oxidation or reduction. The batches may all be melted by the tank or pot methods.

The following is an example of the best mode contemplated by the inventors for carrying out the present invention on a small scale.

Example 1

A 15-pound batch of the calculated composition 1 indicated in Table II was weighed out and mixed using conventional techniques.

An empty silica pot was preheated in a furnace to a temperature of about 2200° F. A portion of the mixed batch was ladled into the preheated pot and the furnace temperature was then gradually increased. The remaining portion of the mixed batch was ladled into the pot at intervals, over a period of two hours while the temperature was gradually raised to about 2420° F. The furnace temperature was then further raised to 2600° F. during the next two hours, at the end of which time substantially all of the glass forming materials were melted.

A mechanical stirrer was then immersed into the molten glass to stir and homogenize the glass. The furnace temperature was increased to 2650° F. and the mechanical stirring was continued for one-half hour. The glass was then held at a furnace temperature of 2650° F. for 45 minutes when the chemical reactions were completed and the glass was substantially free of bubbles and homogenized. The temperature of the furnace was reduced to about 2500° F. over a one-hour period. The glass was then removed from the furnace, poured on a metal table and rolled into the form of a plate. The glass plate was then placed in a kiln and cooled from a temperature of about 1100° F. to 800° F. The cooling rate at this time was about 3° F. per minute. Thereafter, it was cooled more rapidly to room temperature. The cooled glass plate was subsequently cut into pieces suitable for fabrication and testing.

The atmosphere in the melting furnace was neutral or slightly oxidizing during the melting and fining of the glass.

The glass produced was found to exhibit a total luminous transmittance of 21 percent for a two millimeter thickness. The index of refraction was found to be 1.5231. The softening point was determined to be 1316° F. and the coefficient of thermal expansion was found to be $4.9 \times 10^{-6}$ per degree Fahrenheit between 70° F. and 575° F.

To prepare a bifocal ophthalmic lens incorporating the preferred composition of Example I requires fabricating the glass into a lens blank. A countersunk area is then ground into the convex surface of the lens blank. A button of glass of the proper composition is then placed in the countersunk portion of the lens blank and the assembly is then introduced into the fusing furnace.

A suitable glass which can be used as the segment and fused by this technique to the glass of the present invention has the following calculated composition:

| Component: | Percent by weight |
| --- | --- |
| $SiO_2$ | 39.2 |
| BaO | 19.3 |
| $Na_2O$ | 8.3 |
| PbO | 16.6 |
| $B_2O_3$ | 2.7 |
| CaO | 3.9 |
| $TiO_2$ | 2.8 |
| $ZrO_2$ | 6.5 |
| $Sb_2O_5$ | .4 |
| $Al_2O_3$ | .1 |
| CoO | .0041 |
| NiO | .2756 |

This glass composition also contains as an impurity .01 percent by weight $Fe_2O_3$.

A conventional practice is to form a composite button by fusing a glass of high index of refraction, i.e. 1.653, such as the barium glass set forth above and a small segment of the glass of the present invention in edge to edge relationship. This button is then ground and polished to present a smooth, curved surface on one side thereof. The major lens portion, i.e. the glass of the present invention, is then formed with a ground and polished recessed portion conforming to the ground and polished surface of the button. The button and the major lens portion are then brought together and heated to a temperature sufficient to fuse them together. This is shown in U.S. Patent No. 2,640,299.

In the family of glasses of the present invention, $SiO_2$ constitutes the principal network former of the glassy matrix. The principal fluxing ingredients are the alkali metal oxides, principally $Na_2O$ and $K_2O$. The total amount of alkali metal oxide in the composition is maintained between 14 and 19 percent by weight to obtain the suitable melting characteristics of the glass. The weight ratios of $K_2O$ to $Na_2O$ in these high softening point glasses are 1.4 to infinity and are preferably 1.4 to 1.7 to obtain the required properties.

The role of BaO and ZnO in these glasses is principally that of adjusting the index of refraction. The aluminum oxide is partially substituted for $SiO_2$ and tends to increase the viscosities of the glasses and raise the softening point temperatures. Iron oxide, cobalt oxide and selenium are the ingredients which develop the characteristic bronze-smoke color of the glasses. These ingredients also contribute to the other desirable absorptive properties of these glasses. The antimony oxide aids in fining the glasses.

Although the present invention has been described in terms of specific glass compositions, the scope of the present invention should only be limited by the language of the appended claims.

We claim:
1. A bronze-smoke glass consisting in its essential ingredients of the following components in percent by weight: 65 to 73 percent $SiO_2$; 0 to 7.0 percent $Na_2O$; 9.0 to 19.0 percent $K_2O$, the total weight of $Na_2O$ and $K_2O$ being 14 to 19 percent and the weight ratio of $K_2O$ to $Na_2O$ being 1.4 to infinity; 4 to 10 percent ZnO; 0.5 to 5 percent BaO; 0.1 to 4 percent $Al_2O_3$; 1.5 to 5.5 percent $Fe_2O_3$; 0.003 to 0.012 percent CoO; 0.0001 to 0.2 percent Se; 0 to 2.0 percent $Sb_2O_5$; and which has a coefficient of thermal expansion between 4.9 and $5.3 \times 10^{-6}$ per ° F. between 70° F. and 575° F., an index of refraction from 1.521 to 1.525 and a softening point above 1315° F.

2. A bronze-smoke glass having essentially the following calculated composition in percent by weight; 68.3 percent $SiO_2$; 6.9 percent $Na_2O$; 10.1 percent $K_2O$; 7.3 percent ZnO; 2.3 percent BaO; 0.1 percent $Al_2O_3$; 4.9 percent $Fe_2O_3$; 0.0124 percent CoO; 0.0266 percent Se; and which has a luminous transmittance of 19.0 to 23.0 percent at a thickness of 2 millimeters.

3. A bronze-smoke glass having essentially the following calculated composition in percent by weight: 69.2 percent $SiO_2$; 6.3 percent $Na_2O$; 9.9 percent $K_2O$; 6.7 percent ZnO; 1.5 percent BaO; 0.6 percent $Al_2O_3$; 5.1 percent $Fe_2O_3$; 0.0112 percent CoO; and 0.0940 percent Se; and 0.6 percent $Sb_2O_5$, and which has a luminous transmittance of 19.0 to 23.0 percent at a thickness of 2 millimeters.

4. A bronze-smoke glass having essentially the following calculated composition in percent by weight: 67.8 percent $SiO_2$; 6.9 percent $Na_2O$; 9.6 percent $K_2O$; 8.8 percent ZnO; 3.4 percent BaO; 0.1 percent $Al_2O_3$; 3.9 percent $Fe_2O_3$; 0.0094 percent CoO; and 0.0299 percent Se; and which has a luminous transmittance of 30 to 34 percent at a thickness of 2 millimeters.

5. A bronze-smoke glass having essentially the following calculated composition in percent by weight: 67.8 percent $SiO_2$; 6.4 percent $Na_2O$; 9.5 percent $K_2O$; 8.2 percent ZnO; 3.1 percent BaO; 0.6 percent $Al_2O_3$; 3.7 percent $Fe_2O_3$; .0111 percent CoO; .0709 percent Se; and 0.6 percent $Sb_2O_5$; and which has a luminous transmittance of 30 to 34 percent at a thickness of 2 millimeters.

6. A bronze-smoke glass having essentially the following calculated composition in percent by weight: 66.8 percent $SiO_2$; 6.3 percent $Na_2O$; 9.4 percent $K_2O$; 8.7 percent ZnO; 5.3 percent BaO; 0.6 percent $Al_2O_3$; 2.2 percent $Fe_2O_3$; 0.0066 percent CoO; 0.0573 percent Se and 0.6 percent $Sb_2O_5$; and which has a luminous transmittance of 48 to 52 percent at a thickness of 2 millimeters.

References Cited by the Examiner

UNITED STATES PATENTS

| | | | |
|---|---|---|---|
| 2,902,377 | 9/1959 | Duncan | 106—52 |
| 2,938,808 | 5/1960 | Duncan et al. | 106—52 |
| 3,143,683 | 8/1964 | Duncan et al. | 106—52 |

TOBIAS E. LEVOW, *Primary Examiner.*

H. McCARTHY, *Assistant Examiner.*

UNITED STATES PATENT OFFICE

CERTIFICATE OF CORRECTION

Patent No. 3,296,005 January 3, 1967

James E. Duncan et al.

It is hereby certified that error appears in the above numbered patent requiring correction and that the said Letters Patent should read as corrected below.

Column 4, line 67, for "67.8" read -- 67.3 --.

Signed and sealed this 23rd day of July 1968.

(SEAL)
Attest:

Edward M. Fletcher, Jr.

Attesting Officer

EDWARD J. BRENNER

Commissioner of Patents